(12) United States Patent
Parsley et al.

(10) Patent No.: US 11,364,988 B2
(45) Date of Patent: Jun. 21, 2022

(54) MULTI-PURPOSE SHOULDER PANEL SYSTEM

(71) Applicants: John Parsley, Fort Walton Beach, FL (US); David Felker, Fort Walton Beach, FL (US)

(72) Inventors: John Parsley, Fort Walton Beach, FL (US); David Felker, Fort Walton Beach, FL (US)

(73) Assignee: R4 Integration Inc., Fort Walton Beach, FL (US)

( * ) Notice: Subject to any disclaimer, the term of this patent is extended or adjusted under 35 U.S.C. 154(b) by 662 days.

(21) Appl. No.: 16/011,635

(22) Filed: Jun. 19, 2018

(65) Prior Publication Data

US 2019/0382097 A1    Dec. 19, 2019

(51) Int. Cl.
| | |
|---|---|
| *B64C 1/36* | (2006.01) |
| *B64C 1/06* | (2006.01) |
| *B64C 1/12* | (2006.01) |
| *H01Q 1/12* | (2006.01) |
| *H01Q 1/28* | (2006.01) |
| *B64C 1/10* | (2006.01) |

(52) U.S. Cl.
CPC ............... *B64C 1/36* (2013.01); *B64C 1/061* (2013.01); *B64C 1/12* (2013.01); *H01Q 1/12* (2013.01); *H01Q 1/28* (2013.01); *B64C 1/10* (2013.01); *B64C 2201/021* (2013.01)

(58) Field of Classification Search
CPC ... B64C 1/12; B64C 1/36; H01Q 1/12; H01Q 1/28; H01Q 1/42; H01Q 1/282
See application file for complete search history.

(56) References Cited

U.S. PATENT DOCUMENTS

| | | | |
|---|---|---|---|
| 6,977,618 B1 * | 12/2005 | Hanewinkel, III | H01Q 1/1235 343/705 |
| 9,419,329 B1 | 8/2016 | West et al. | |
| 9,457,886 B2 | 10/2016 | Hazen | |
| 9,689,412 B1 * | 6/2017 | Smith | F16B 5/0642 |
| 2006/0273968 A1 * | 12/2006 | Noro | H01Q 1/42 343/713 |
| 2011/0217976 A1 * | 9/2011 | Kaplan | H01Q 21/28 455/427 |
| 2013/0214964 A1 * | 8/2013 | Holt | G01S 13/882 342/120 |
| 2013/0263514 A1 * | 10/2013 | Parsley | E06B 5/00 49/460 |

(Continued)

FOREIGN PATENT DOCUMENTS

WO    2014015127    3/2014

*Primary Examiner* — Joshua J Michener
*Assistant Examiner* — Arfan Y. Sinaki
(74) *Attorney, Agent, or Firm* — The Law Firm of Andrea Hence Evans, LLC

(57) ABSTRACT

An aircraft multi-purpose shoulder panel system having a shoulder panel insert is disclosed. The system features a circumferential base connected to the shoulder panel insert, an antenna compartment positioned on top of the circumferential base, and a removable antenna mounting plate positioned above, and connected to, the antenna compartment. The system also features an overall structure that provides unprecedented ruggedness, and enables aircraft antennae/sensor versatility, adaptability and reversibility.

17 Claims, 4 Drawing Sheets

(56) References Cited

U.S. PATENT DOCUMENTS

| | | | |
|---|---|---|---|
| 2014/0028520 A1* | 1/2014 | Huynh | H01Q 1/42 |
| | | | 343/848 |
| 2014/0327577 A1 | 11/2014 | Ozaki et al. | |
| 2015/0197345 A1* | 7/2015 | Abbinante | H01Q 1/282 |
| | | | 244/129.1 |
| 2016/0172748 A1* | 6/2016 | Keen | H01Q 1/422 |
| | | | 343/872 |
| 2017/0129588 A1* | 5/2017 | Verillion, Jr. | B64C 1/36 |
| 2017/0201017 A1 | 7/2017 | Cordone | |
| 2017/0313402 A1* | 11/2017 | Flores | H01Q 1/1214 |
| 2018/0351243 A1* | 12/2018 | Lewis | H01Q 1/42 |
| 2019/0326665 A1* | 10/2019 | Juergens | H01Q 1/12 |

* cited by examiner

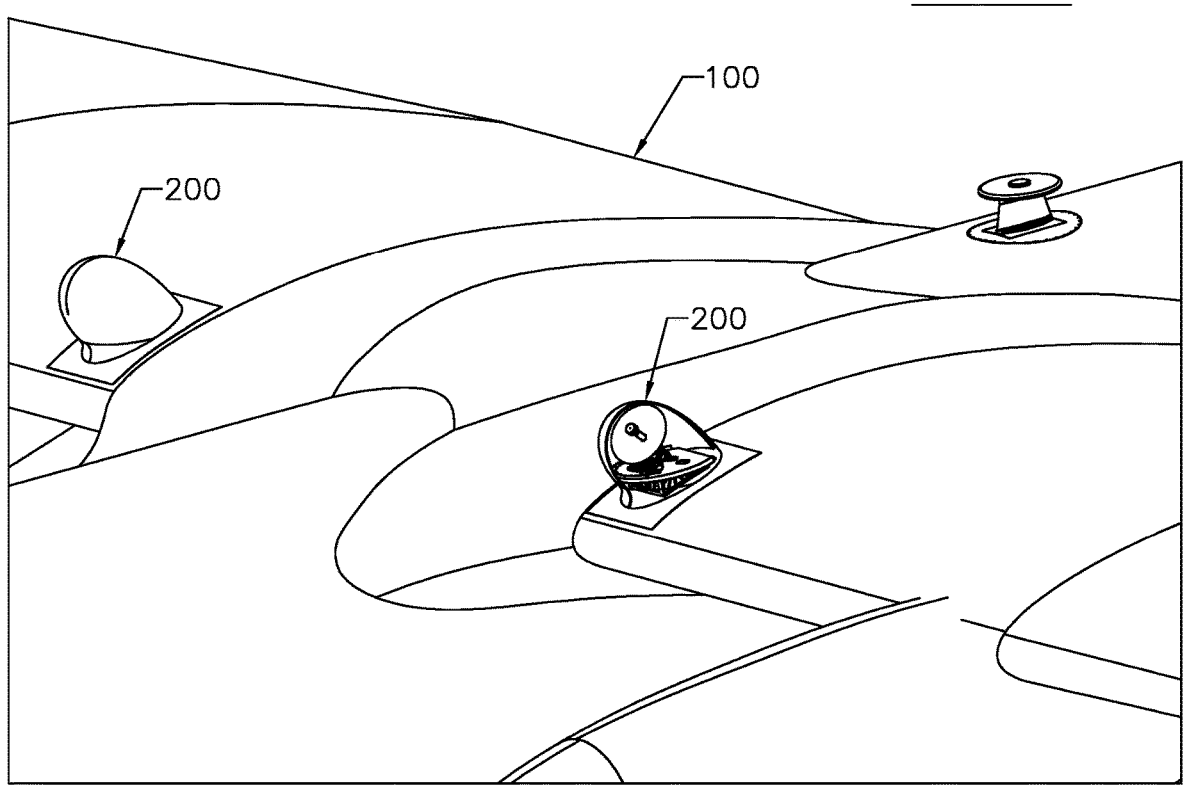

MULTI-PURPOSE SHOULDER PANEL SYSTEM

FIELD OF THE INVENTION

The present invention relates in general to an aircraft multi-purpose shoulder panel system, and more specifically to an aircraft multi-purpose shoulder panel system that accommodates different aircraft antenna and/or sensor configurations.

BACKGROUND OF THE INVENTION

The classical approach of permanently modifying the upper fuselage of aircraft to install a communications antenna limited installation of new systems and/or new antennae/sensor(s). As an answer to this limitation, the industry has adopted the "roll-on/roll-off" alternative approach in reducing the limitations of the installation of any new system(s). The "roll-on/roll-off" solution provides some relief by allowing users to transport and install the specific system they need based on mission requirements and remove it at mission completion. However, the "roll-on/roll-off" approach has limitations as the number of positions for temporary antennas on aircraft is very limited. As such, there is a need for an antenna system that is versatile, adaptable and may be located or positioned at an optimal aircraft location without obscuring hemispherical visibility.

SUMMARY OF THE INVENTION

This invention introduces an aircraft multi-purpose shoulder panel system for installing multiple configurations of antennas which can be easily removed and quickly installed to configure an aircraft for a specific mission. Aspects of embodiments of the present invention involve positioning of the contemplated system at an access panel (e.g., access panel 200 of aircraft 100 of FIG. 3) mounted on the upper/center wing. The access panel 200 was originally designed to provide maintenance access into the leading edge of the wing at the wing/fuselage junction. Because the area under the wing where it merges into the fuselage 304 is generically referred to as the "arm pit", by default a panel above and forward of the "arm pit" is referred to as the wing "shoulder panel" (e.g., access panel 200 of aircraft 100 of FIG. 3).

There are several characteristics that make this access panel (e.g., access panel 200 of aircraft 100 of FIG. 3) an ideal choice for redesign into a communications installation location:

1. It is not on the center-line 303 of the aircraft 100. It does not impede foot travel, as is required for maintenance and inspections, thereby eliminating safety concerns of tripping and falling. It does not compete with other permanently installed RF systems. Many antennas have a mandatory minimum spacing requirement to prevent interference. The centerline 303 of the aircraft is crowded to the extent that the turbulence from one antenna impacts the next one aft of it.

2. This approach also eliminates the need to drill or cut into the "backbone" of the aircraft which inherently degrades the structural characteristics of the aircraft.

3. The aircraft structure around the shoulder panel (e.g., access panel 200 of aircraft 100 of FIG. 3) is exceptionally robust. The redesign from an aerodynamically smooth access panel 200 to a satellite communications system redefines the loads and forces imposed on the attaching aircraft structure. This location is bordered by two of the wing leading edge ribs 301 and the forward face of the main wing spar 302, all of which can manage the new load paths without modification. There are adequate pre-existing fastener holes around the perimeter, hence no new holes are required.

4. The location is inboard of the lift generating section of the wings and, as such, does not impact the aerodynamic characteristics of the wings. There are no external systems aft of the shoulder panel to be affected by whatever turbulence is generated.

5. No obstructions: The location provides complete upper hemispherical visibility.

An aspect of an embodiment of the present invention contemplates an aircraft multi-purpose shoulder panel system that may be positioned/installed at the wing shoulder panel of an aircraft. The aircraft multi-purpose shoulder panel system may include a shoulder panel insert, a circumferential base connected to the shoulder panel insert, an antenna compartment positioned on top of the circumferential base, and a removable antenna mounting plate positioned above, and connected to, the antenna compartment.

In an aspect of an embodiment of the present invention, the multi-purpose shoulder panel system may include a covering structure, where the covering structure covers the multi-purpose shoulder panel system and is connected to the circumferential base.

In an aspect of an embodiment of the present invention, the removable antenna mounting plate may be connected to the antenna compartment by one or more vertical connectors.

In an aspect of an embodiment of the present invention, the removable antenna mounting plate may be inclined or tilted at an angle. This, in one aspect, may be made possible by way of the one or more vertical connectors.

In an aspect of an embodiment of the present invention, the multi-purpose shoulder panel system may include one or more fenestrations or openings at the circumferential base, where the one or more fenestrations or openings enables electronic and electrical connections to antennas installed within the multi-purpose shoulder panel system.

In an aspect of an embodiment of the present invention, the shoulder panel insert may be contoured to enable flush installation of the system onto an aircraft.

In an aspect of an embodiment of the present invention, the multi-purpose shoulder panel system may include a plurality of fasteners for fastening the shoulder panel insert to pre-existing fastener holes on the aircraft.

Advantages of the contemplated invention include:

1. Reversibility. Because there are no permanent modifications required (no new holes) the installation is considered as "Temporary". Reversible also means that the system can be removed, and the aircraft returned to its original configuration.

2. Adaptability/Upgrade Ability: Because the system is a temporary installation, system components can be replaced, upgraded, exchanged or removed at any time. The contemplated system can also accommodate any of the MPHA/MPVHS Antenna and/or Sensor configurations. The antenna plate and radome may be re-configured or replaceable with customer defined hardware.

3. Location: The installed location of the system (i.e. the wing shoulder portion of the aircraft) does not impact existing installed systems, does not impact basic aircraft aerodynamics, and has never been utilized except as an access panel.

4. Versatility: The contemplated system's large mounting surface allows for a variety of antenna solutions, including parabolic and phased array antenna solutions.
5. No Aircraft Modification: Use of the contemplated system enables expansion of aircraft communication and data capability without modification of the aircraft.

Additional aspects, objectives, features and advantages of the present invention will become apparent from the following description of the preferred embodiments with reference to the attached drawings.

BRIEF DESCRIPTION OF THE DRAWINGS

The features and advantages of aspects of the present invention will become more apparent from the detailed description set forth below when taken in conjunction with the claims and drawings, in which like reference numbers indicate identical or functionally similar elements.

FIG. 1 illustrates a perspective view of an aircraft multi-purpose shoulder panel system according to an aspect of an embodiment of the present invention.

DETAILED DESCRIPTION OF THE INVENTION

Referring now to FIG. 1, a perspective view of an aircraft multi-purpose shoulder panel system 200 is shown on aircraft 100 according to an aspect of an embodiment of the present invention. Multi-purpose shoulder panel system 200 is positioned in the wing shoulder portion of aircraft 100. Wing shoulder portion of aircraft 100 presents an optimal position for multi-purpose shoulder panel system 200 as the location does not obstruct or interfere with other aircraft antennae, sensors or control surfaces. The wing shoulder portion of aircraft 100 also eliminates the potential for antenna cracking associated with the center radome hatch installation. Further still, the wing shoulder portion is outside of the propeller wash and flight control surfaces. As such, there is no impact of positioning the multi-purpose shoulder panel system 200 at the wing shoulder portion of aircraft 100. Multi-purpose shoulder panel system 200 may also be installed on either wing shoulder portion of aircraft 100.

Figure 2A:
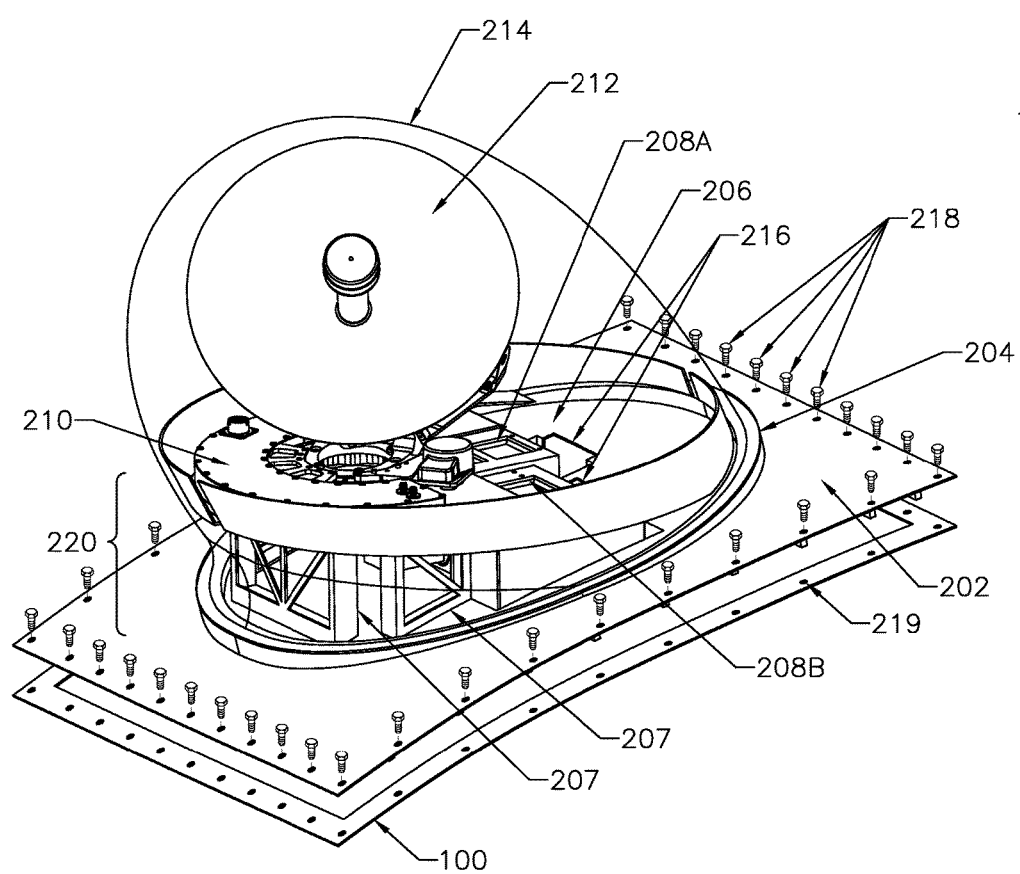
FIGS. 2A & 2B illustrate more detailed perspective views of an aircraft multi-purpose shoulder panel system according to an aspect of an embodiment of the present invention.
Figure 2B:
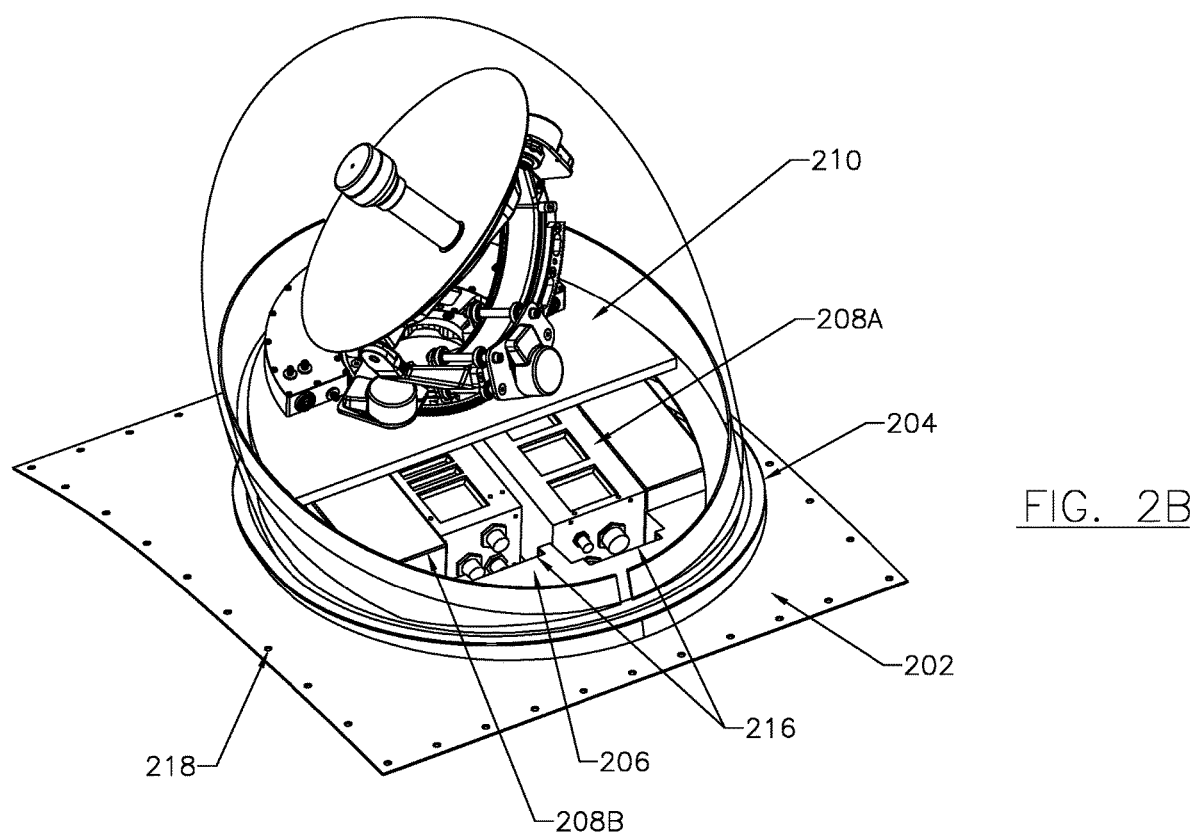
Figure 3:
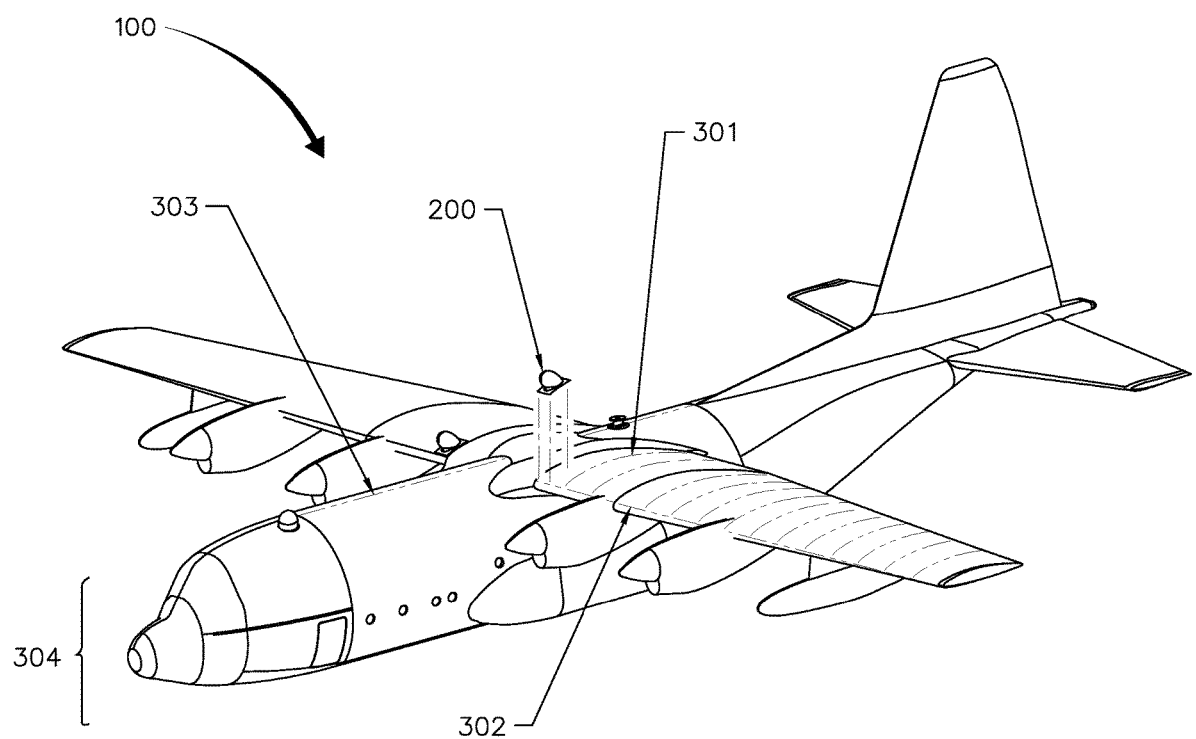
FIG. 3 illustrates a perspective view of an aircraft having a shoulder panel, a wing leading edge rib, a forward face of a main wing spar, a center line of the aircraft, and a fuselage.

Referring now to FIGS. 2A and 2B more detailed perspective views of aircraft multi-purpose shoulder panel system 200 are shown according to aspects of embodiments of the present invention. Shoulder panel system 200 is shown with shoulder panel insert 202 which is installed onto the wing shoulder portion of 30 aircraft 100. In an aspect of an embodiment of the present invention, shoulder panel insert 202 may be contoured to enable flush installation of multi-purpose shoulder panel system 200 onto aircraft 100 using pre-existing holes 219. In an aspect of an embodiment of the present invention, the shoulder panel insert 202 may be designed using a solid billet aluminum construction which provides a rugged design which flexes with wing movement and no induced stress.

Connected to shoulder panel insert 202 is circumferential base 204 which forms the connection point for additional components of shoulder panel system 200. Positioned on top of or above circumferential base 204 is antenna compartment 206. In an aspect of an embodiment of the present invention, antennae compartment 206 may be structurally configured to receive Ku and Ka Block Up Converters 208A and 208B, or the like. In an aspect of an embodiment of the present invention, removable antenna mounting plate 210 may be connected to antenna compartment 206 by one or more vertical connectors 207.

Positioned above, and connected to, antenna compartment 206 is removable antenna mounting plate 210 which may be structurally configured to receive Ku/Ka Band antenna 212 or similar antennae/sensor(s). In an aspect of an embodiment of the present invention, multi-purpose shoulder panel system 200 may include covering structure 214, where covering structure 214 covers multi-purpose shoulder panel system 200 and is connected to circumferential base 204.

In an aspect of an embodiment of the present invention, removable antenna mounting plate 206 may be inclined or tilted at an angle 220. This, in one aspect, may be made possible by way of the one or more vertical connectors 207—which may, in another aspect of an embodiment of the present invention, have different heights to tilt antenna mounting plate 206.

In an aspect of an embodiment of the present invention, multi-purpose shoulder panel system 200 may include one or more fenestrations or openings 216 at circumferential base 204, where the one or more fenestrations or openings 216 may be used to channel electronic and electrical connections to antennas and/or power systems installed within multi-purpose shoulder panel system 200.

In an aspect of an embodiment of the present invention, circumferential base 204 may include a concentric arrangement of a pressure seal, seal retaining ring and a weather seal, where the pressure seal rings the circumference of circumferential base 204, where the seal retaining ring is circumferentially positioned along the periphery of the pressure seal and where the weather seal is circumferentially positioned along an outer periphery of circumferential base 204.

In an aspect of an embodiment of the present invention, multi-purpose shoulder panel system 200 may include a plurality of fasteners 218 for fastening shoulder panel insert 202 to pre-existing fastener holes 219 on aircraft 100.

Although this present invention has been disclosed with reference to specific forms and embodiments, it will be evident that a great number of variations may be made without departing from the spirit and scope of the present invention. For example, steps may be reversed, equivalent elements may be substituted for those specifically disclosed and certain features of the present invention may be used independently of other features—all without departing from the present invention as defined in the appended claims.

What is claimed is:

1. A multi-purpose shoulder panel system configured for attachment to a shoulder panel of an aircraft, the system comprising:
   a shoulder panel insert reversibly attachable to the shoulder panel;
   a circumferential base connectable to the shoulder panel insert;
   an antenna compartment configured to be positioned on top of the circumferential base; and
   a removable antenna mounting plate positioned above, and connectable to, the antenna compartment.

2. The multi-purpose shoulder panel system of claim 1, further comprising: a covering structure, wherein the covering structure is configured to cover the multi-purpose shoulder panel system and is connectable to the circumferential base.

3. The multi-purpose shoulder panel system of claim 1, wherein the removable antenna mounting plate is connectable to the antenna compartment by at least one vertical connector.

4. The multi-purpose shoulder panel system of claim 1, wherein the removable antenna mounting plate is inclined at an angle.

5. The multi-purpose shoulder panel system of claim 1, further comprising a fenestration and/or an opening at the circumferential base, wherein the fenestration and/or the opening enables electronic and/or electrical connections to block up converters installed within the multi-purpose shoulder panel system.

6. The multi-purpose shoulder panel system of claim 1, wherein the shoulder panel insert is contoured for a flush installation of the multi-purpose shoulder panel system to the shoulder panel of the aircraft.

7. The multi-purpose shoulder panel system of claim 1, further comprising a plurality of fasteners for fastening the shoulder panel insert to pre-existing fastener holes on the shoulder panel of the aircraft.

8. An aircraft configured for a communication, comprising:
   an access panel of a wing-fuselage junction of the aircraft; and
   a multi-purpose panel system, comprising:
      a panel insert attached to the access panel;
      a circumferential base connected to the panel insert;
      an antenna compartment positioned on top of the circumferential base;
      a removable antenna mounting plate positioned above, and connected to, the antenna compartment; and
      an antenna and/or a sensor disposed within the antenna compartment and configured to send and/or receive radiation for the communication.

9. The aircraft of claim 8, wherein the multi-purpose panel system is covered by a covering structure connected to the circumferential base.

10. The aircraft of claim 8, wherein the removable antenna mounting plate is connected to the antenna compartment by at least one vertical connector.

11. The aircraft of claim 8, wherein the removable antenna mounting plate is inclined at an angle.

12. The aircraft of claim 8, further comprising a fenestration and/or an opening at the circumferential base, wherein the fenestration and/or the opening enables electronic and/or electrical connections to block up converters installed within the multi-purpose panel system.

13. The aircraft of claim 8, wherein the panel insert is contoured and flush with the access panel of the aircraft.

14. The aircraft of claim 8, wherein the panel insert is fastened to pre-existing fastener holes on the access panel of the aircraft with a plurality of fasteners.

15. The aircraft of claim 8, wherein the multi-purpose panel system is a multi-purpose shoulder panel system, the panel insert is a shoulder panel insert, and the access panel is a shoulder panel, and wherein the shoulder panel is positioned adjacent to a wing leading edge rib and a forward face of a main wing spar.

16. The aircraft of claim 15, wherein the shoulder panel insert is reversibly attached to the shoulder panel to temporarily configure the aircraft for the communication.

17. The aircraft of claim 8, wherein the access panel is not on a center line of the aircraft.

\* \* \* \* \*